United States Patent Office 3,085,667
Patented Apr. 16, 1963

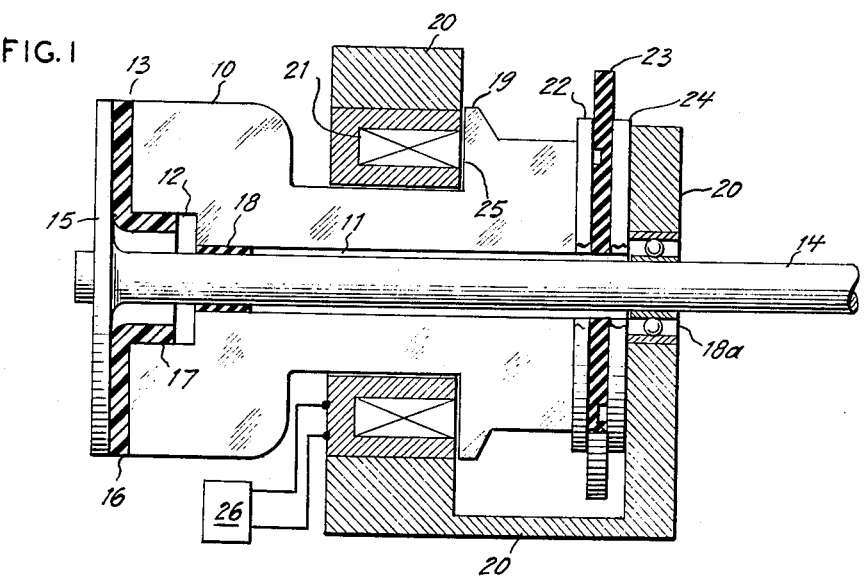
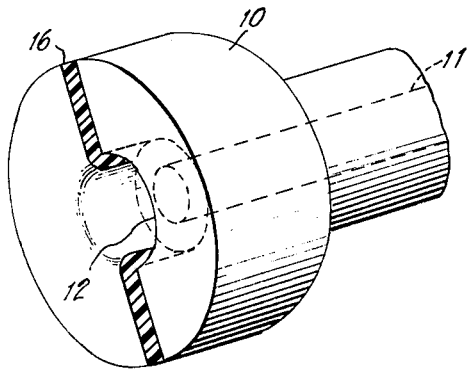
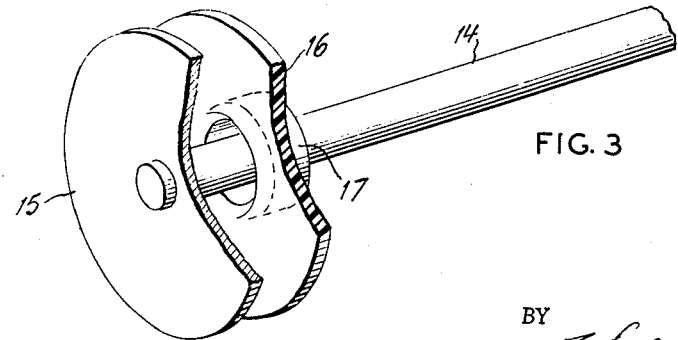

3,085,667
CLUTCH BRAKE FRICTION DISK
Albert P. Lang, Philadelphia, Pa., assignor to Sperry Rand Corporation, New York, N.Y., a corporation of Delaware
Filed Sept. 10, 1959, Ser. No. 839,123
4 Claims. (Cl. 192—66)

The present invention is concerned with clutch and brake mechanisms such as are to be found in complex arrangements of apparatus generally associated with input and output equipment in the data processing field. The mechanisms generally to be found in such apparatus are of an intricate nature and very often are required to operate at high speeds and with frequent starting and stopping. Such services impose high loads on certain portions of the apparatus, more particularly, clutch units for transmitting power from a prime mover to a particular mechanism or brake units for quickly halting the motion of a mechanism following a cycle of operation. Because then of this rather heavy service to which such clutch/brakes have been subjected with prior art mechanisms, they have tended to wear rapidly and have thereby constituted a serious and recurrent maintenance problem.

The present invention seeks to overcome this problem by improving the structure of one of the essential elements of clutches and brakes whereby improved and longer lived materials may be used to their best advantage.

It is, accordingly, an object of this invention to present a new and improved electro-mechanical clutch/brake unit capable of withstanding many cycles of operation without requiring maintenance.

It is a further object of the invention to provide a new and improved clutch/brake facing whereby materials having improved wearing qualities may be employed to their best advantage.

Other objects and advantages will become apparent as the description proceeds.

In providing for the foregoing objects, the invention essentially reduces wear from what, in the prior art, has constituted the greatest and most serious source thereof. In essence the invention provides an entirely new type of floating facing for clutch and brake mechanisms which by its structure is inherently self centering and wear reducing.

The objects, advantages and construction of the invention will become apparent from a consideration of the accompanying drawings in which:

FIGURE 1 is a diagrammatic illustration of a cross section of an assembled clutch/brake unit according to the invention.

FIGURE 2 is a perspective view of one of the power transmitting elements of the clutch/brake unit which takes the form of an exterior thimble.

FIGURE 3 is an exploded perspective view of an output shaft and disk for assembly along with the integral friction disk centering sleeve arrangement of the invention.

In FIGURES 1 and 2 there is shown a thimble 10 which serves as a portion of the power transmitting assembly. This thimble, which may be formed from a metal casting, is seen to have a cylindrical form, with one end 13 being machined to provide a clutch/brake facing plate. A bore 11 extends axially through the center of the cylindrical thimble and a counterbore 12 of larger diameter extends axially into the cylindrical thimble from the facing plate end 13 thereof.

Extending through the bore 11 of the thimble is a rotatable shaft 14 which is journalled in the bore by means of a bearing 18 and in a stationary machine support 20 by means of bearing 18a. Fixedly mounted on shaft 14 at the end adjacent the thimble end facing plate 13 is a disk 15 which disk constitutes the other facing plate element of the clutch/brake assembly.

Interposed between the facing plate end 13 of thimble 10 and the disk 15 is a friction element 16 (FIG. 3) having an annular form. Integrally formed with this annular disk is a sleeve 17 disposed at the central opening of the disk element 16. This combined sleeve 17 and annular friction disk 16 constitutes the element which transmits power between disk 15 and the end facing plate 13 of thimble 10. It is contemplated that the element 16 with its integral sleeve 17 may be produced by molding in one piece from a resinous material such as one of the fluorocarbons (Teflon), or nylon, or possibly an asbestos based material. The choice of material is dependent upon the type of load for which the clutch is intended. Thus, where the clutch is intended to achieve extremely rapid acceleration, an asbestos base material would be indicated. The exterior diameter of the annulus 16 is made substantially equal to that of disk 15 and the end facing 13 of thimble 10. The interior diameter of the sleeve 17 is made sufficiently large to accommodate the output shaft 14 without contact therewith and the exterior diameter of the sleeve 17 is made slightly smaller than the interior diameter of the counterbore 12 whereby when the clutch/brake unit is disengaged the overall friction transmitting element 16—17 may rotate freely within the counterbore 12. Such free rotatability serves a dual purpose inasmuch as it enables rapid and convenient replacement of the element, and at the same time the "floating" nature of such facing element tends to equalize wear over the entire surface area.

The embodiment of the invention depicted by FIGURE 1 is that of a brake. To accomplish braking, it is necessary that the thimble 10 be prevented from rotating. Inasmuch as axial compliance must be allowed in order to engage the brake, an Oldham type coupling, represented as 22, 23, 24 on FIGURE 1, is provided. One element 22 of such coupling is attached to the thimble 10 with the other element 24 being attached to a portion of the machine frame 20. If the invention is to serve as a clutch rather than as a brake then coupling element 24 could be attached to the output shaft of a prime mover.

Magnet coils 21 are attached to the machine frame 20 and may act upon armature portion 19 through air gap 25. Such magnet coils are selectively actuated from a signal source 26.

In operation as a brake, the thimble 10 is fixed against rotation and shaft 14 represents the rotatable element to be braked. In FIGURE 1 thimble 10 is anchored against rotation through the use of the Oldham type coupling 22, 23, 24 which effectively locks the thimble against rotation while yet permitting the required amount of axial compliance. Then, when an electrical impulse is applied to coils 21 thimble 10 at armature 19 is moved to the left to close the air gap 25. This forces end plate 13 of thimble 10 into operative juxtaposition with the disk 15 of the shaft 14 via the friction coupling disk 16. As this occurs, the thimble 10 being fixed against rotation via the Oldham coupling 22, 23 and 24, causes the motion of the disk 15 and its shaft 14 to be rapidly halted. There is only one part subject to any serious wear which is, of course, the annular portion 16 of the friction disk. Since as soon as disk 15 and thimble 10 are locked together, no further wear can take place, it is clear that very little wear will take place, and, in fact, field tests of the device have proven that through use of the new design in conjunction with presently available composition materials the life of one of these units is many times the life of known prior art units.

In summary, it will be recognized that the friction disk 16 together with the integrally formed sleeve 17 and the axial bore 12 provide a readily replaceable friction disk assembly offering long life of operation. The integrally formed sleeve 17 and bore 12 provide a self centering feature for the disk 16 doing away with the need for riveting, cementing or otherwise securing the disk 16 to the disk 15 or end facing 13. This feature permits easy replacement of the disk 16 and maximizes the amount of wear such disk can be subjected to before replacement thereof is necessary. Also since the disk 16 has a floating mount and can rotate, its wear tends to be more uniform thereby further adding to the life of the disk 16.

Modifications of minor features of the invention presented herewith will be apparent to those skilled in the art and it must be understood that the foregoing description is illustrative only and should not be considered as limiting the invention. All such possible modifications are meant to fall within the scope of the appended claims.

I claim:

1. A mechanical brake or clutch comprising a cylindrical body provided with a central axial bore, a concentric counterbore of greater diameter than said axial bore, an end facing on said cylindrical body, a shaft extending through and rotatable within said bore and counterbore, a disk attached to and rotatable with said shaft, means selectively urging one of either said disk or said cylindrical body in an axial direction thereby to establish selectively a power transmitting relationship between said disk and said body, and friction means interposed between said end facing of said body and said disk, said friction means comprising an integrally formed sleeve and annulus wherein said annulus serves as a friction transmitting element between said disk and said end facing of said body and said sleeve maintains said annulus centrally located relative to said shaft.

2. A mechanical clutch or brake assembly as in claim 1 wherein the outer diameter of said sleeve is slightly less than the diameter of said counterbore whereby said sleeve is movably receivable in said counterbore.

3. In a combination, a first power transmitting element, a second power transmitting element adapted to be operatively coupled to said first element and coupling means for effecting frictional coupling between said first and second elements, said first power transmitting element comprising a disk attached to a rotatable shaft, said second power transmitting element comprising a cylinder provided with a power transmitting end face, a bore and a counterbore, said shaft extending through said bore and counterbore so that said disk is located adjacent said power transmitting end face, said coupling means being interposed between said disk and said power transmitting end face, said coupling means comprising an integrally formed sleeve portion and annulus portion of a composition type material, wherein said annulus portion effects said coupling, and said sleeve portion positively locates said annulus portion relative to said first and second elements by extending into said counterbore.

4. A mechanical brake or clutch comprising a cylindrical body provided with a central axial bore, a concentric counterbore of greater diameter than said axial bore, an end facing on said cylindrical body, a shaft extending through and rotatable within said bore and counterbore, an element attached to and rotatable with said shaft, means selectively urging one of either said element or said cylindrical body in an axial direction thereby to establish selectively a power transmitting relationship between said element and said body, and friction means interposed between said end facing of said body and said element, said friction means comprising an integrally formed sleeve and annulus wherein said annulus serves as a friction transmitting element between said element and said end facing of said body and said sleeve maintains said annulus centrally located relative to said shaft.

References Cited in the file of this patent

UNITED STATES PATENTS

| | | |
|---|---|---|
| 638,656 | Theilengerdes | Dec. 5, 1899 |
| 709,194 | Bennett | Sept. 16, 1902 |
| 762,622 | Eastwood | June 14, 1904 |
| 2,248,764 | Krenzke | July 8, 1941 |
| 2,418,466 | Drake | Apr. 8, 1947 |
| 2,857,030 | Samo | Oct. 21, 1958 |